United States Patent [19]

Steinke et al.

[11] Patent Number: 5,043,173

[45] Date of Patent: * Aug. 27, 1991

[54] BROWNING AGENT FOR FOODSTUFFS

[75] Inventors: James A. Steinke, Cincinnati; David B. Josephson, South Lebanon; Daniel J. Wampler, Cincinnati; Christine M. Frick, Lebanon, all of Ohio

[73] Assignee: Fries & Fries, Inc., Cincinnati, Ohio

[ * ] Notice: The portion of the term of this patent subsequent to Nov. 6, 2007 has been disclaimed.

[21] Appl. No.: 594,722

[22] Filed: Oct. 9, 1990

Related U.S. Application Data

[63] Continuation of Ser. No. 271,538, Nov. 15, 1988, Pat. No. 4,968,522.

[51] Int. Cl.$^5$ .............................................. A23D 5/00
[52] U.S. Cl. ...................................... 426/94; 426/602; 426/262; 426/540
[58] Field of Search .................. 426/602, 262, 540, 94

[56] References Cited

U.S. PATENT DOCUMENTS

| | | | |
|---|---|---|---|
| 4,022,920 | 5/1977 | Doornbos | 426/534 |
| 4,144,357 | 3/1979 | Mohammed | 426/331 |
| 4,229,483 | 10/1980 | Oura | 426/250 |
| 4,252,832 | 2/1981 | Moody | 426/653 |
| 4,346,121 | 8/1982 | Turos | 426/602 |
| 4,448,791 | 5/1984 | Fulde | 426/275 |
| 4,466,986 | 8/1984 | Guggenbuehler | 426/422 |
| 4,518,618 | 5/1985 | Hsia | 426/652 |
| 4,528,201 | 7/1985 | Purves | 426/262 |
| 4,735,812 | 4/1988 | Bryson | 426/652 |
| 4,968,522 | 11/1990 | Steinke | 426/602 |

*Primary Examiner*—Carolyn Paden
*Attorney, Agent, or Firm*—Wood, Herron & Evans

[57] ABSTRACT

A browning agent for foodstuffs having a carbonyl-containing browning reactant is disclosed comprising a water-in-oil emulsion, a surfactant and an edible base in the aqueous phase adapted to enduce a browning reaction in the foodstuff upon heating. The browning agent may be coated onto foodstuffs such as biscuits, pizza, pie coverings or hash brown potatoes, stored at temperatures from about −30° C. to about 10° C. thereafter immediately microwaved to enduce browning.

10 Claims, No Drawings

BROWNING AGENT FOR FOODSTUFFS

This is a continuation of application Ser. No. 07/271,538, filed Nov. 15, 1988 which is now U.S. Pat. No. 4,968,522.

BACKGROUND OF THE INVENTION

Browning agents for foodstuffs have been prepared and, when added to or coated onto foodstuffs, facilitate the browning thereof during cooking. Browning agents generally are intended to achieve the effect of natural browning reactions of food during conventional cooking as caused by the well known Maillard reaction which is the reaction between reducing sugars and amino acids of the proteins in the food. The Maillard reaction occurs at normal cooking temperatures and is dependent on a number of factors such as temperature, pH, concentration, water activity, oxygen supply, and nature of the raw materials, among other factors. A number of patents have issued directed to browning agents for foodstuffs having carbonyl-containing components for the browning reaction and, in particular, as microwavable browning coatings including U.S. Pat. No. 4,448,791; Japanese Patents 46-30772 (1971) and 48-16179 (1973); and European Patent Application 0 203 725 (1986). These patent publications are directed to browning agents and compositions that depend upon the reaction of an amino acid and sugar, especially as the reaction may be catalyzed by the addition of alkali to allow the reaction to take place at lower temperatures.

The present state of the art demands further improvements to be made in browning agents. Browning agents are needed that do not introduce an undesirable flavor into the foodstuff being browned. Furthermore, foodstuffs that contain available browning ingredients tend to discolor upon storage prior to use. It is not uncommon for even frozen foodstuffs that are flour-based to start discoloration in frozen storage, and some even turn black thereby tending to look spoiled. There is a definite need for storable foodstuffs containing browning agents that look attractive and yet may be quickly heated and browned even under the most demanding conditions of microwave ovens.

SUMMARY OF THE INVENTION

This invention is directed to a browning agent for foodstuffs having a carbonyl-containing browning reactant that overcomes the several problems confronting browning compositions according to the current state of the art. The browning agent of this invention is a water-in-oil emulsion containing water in the discontinuous phase and oil in the continuous phase. A surfactant is present for stabilization of the emulsion and an edible base is contained in the aqueous phase to induce the browning reaction upon heating foodstuffs having the carbonyl-containing reactant. The emulsion is adapted for incorporation into or coating onto foodstuffs that contain the carbonyl reactant that induces browning upon heating.

In a preferred form of the invention, the water-in-oil emulsion contains an edible base that provides a pH on the order of about 8-13 in the emulsion to obtain a desired browning reaction within a reasonable time and to provide an edible product. Below a pH of about 8, the reaction is slower at a given temperature and, above pH 13, the product would not have current governmental food approval. Foodstuffs having carbonyl-containing browning reactants that may be browned include natural ingredients such as flours, carbohydrates and the like, having the necessary reactants such as reducing sugars, reducing sugars and amino acids, carbonyls derived from lipids, and the like components that may react under heat. These reactants are well known and may also be present in other foodstuffs such as meats. Biscuits, pizza, hash brown potatoes, and other such foodstuffs may be browned with the browning agent of this invention. Furthermore, it has been found that the browning agent of this invention may be incorporated into or coated onto such foodstuffs, placed in colder frozen storage at about −30° C. to 10° C., and removed for direct microwave browning. It has been found that discoloration normally occurring in prior art foodstuffs upon storage is eliminated.

This invention will be further understood along with its benefits and advantages with reference to the following detailed description.

DETAILED DESCRIPTION

The browning agent of this invention is suitable for use with foodstuffs having carbonyl-containing browning reactants exemplified by those foodstuffs naturally containing brownable mono- and polysaccharides, especially reducing sugars with or without amino acids, that are known to induce browning. The water-in-oil or inverted fat emulsions suitable for use according to the principles of this invention contain water in the discontinuous phase and oil in the continuous phase. A surfactant stabilizes the emulsion and an edible base is contained in the aqueous phase. The edible base is protected in the inverted emulsion against transfer into the surrounding matrix and reaction with a carbonyl or carbonyl-amino acid reaction system in the foodstuff until cooking. Under the action of heat during the normal cooking cycle, the emulsion breaks down causing the base to come into contact with the browning reactants whereby browning occurs upon cooking. Thus, the very desirable features of preventing a pre-reaction of reactants upon storage are achieved by the encapsulated browning agent of this invention. The colored or spoiled appearance normally associated with products provided according to known techniques is avoided by the utilization of browning agents of this invention.

The oil or fat suitable for use in the inverted emulsions of this invention include any edible oil or fat. As suitable examples, vegetable oils or vegetable fats can be employed. Any edible base may be used including potassium carbonate, sodium carbonate, trisodium phosphate or the like. Such edible bases in aqueous media provide pHs on the order of about 8-13. In its most preferred form, the water-in-oil (W/O) emulsion is made with a concentrated solution of the materials so as to provide long term stability to the product. The term "emulsion" is used herein to define the inverted state of water in oil, but it is to be understood that such state may be a dispersion, especially where the phases are not as distinct such as in microemulsions. The inverted emulsions are made according to well known fat or oil emulsification techniques that form no particular part of this invention. Preferably, emulsification or dispersion is achieved such that the inverts are opaque or as transparent as possible, normally in a state of emulsification or dispersion achieved in microemulsions. Emulsions thus may exist as soft solids or viscous liquids at room temperature and would tend to be off-white or clear in color. The relatively colorless nature of the browning agents of this invention offers a substantial advantage over those compositions that have been dyed in the past or provide undesirable colors to the foodstuffs that are being prepared. The agents of this invention provide neutral colors and neutral flavors that are undetectable in the prepared and stored foodstuffs and yet provide a desirable browning effect during cooking. As indicated above, the browning agents of this invention are especially suitable for use under the demanding conditions of microwave heating. They may also be heated in a conventional oven. An edible surfactant is necessary in the composition in order to stabilize the emulsion. Any available surfactant is suitable for this purpose especially nonionic surfactants including mono- or poly-fatty acid esters of glycerol as exemplified by mono- or di-($C_{10}$–$C_{18}$) fatty acid glycerides that are well known and available for use. Other ionic surfactants such as soaps of fatty acids and phospholipids (e.g., lecithin) may be employed.

In this specification, the terms "oil" and "fat" are used synonymously. Such fatty materials may be liquid, soft solid, or solid at room temperature, and would soften or liquify upon heating. Fats, however, may include hard fats selected from animal fats and vegetable or fish oils. Hard fats may be selected from coconut oil, corn oil, cottonseed oil, fatty-pork tissue, lard, palm oil, shortenings, safflower oil, sunflower oil, tallow or any mixtures or equivalents thereof. It is to be understood, however, that the fat may have liquid oils ultimately mixed with hard fats so long as they are capable of forming the inverted fat emulsion of this invention. Preferred liquid oils include coconut oil, corn oil, cottonseed oil, safflower oil, soybean oil, sunflower oil, or mixtures or equivalents thereof. It is to be understood when it is desirable to confer certain animal flavor notes to foodstuffs, in addition to browning, fatty materials may be selected from those fats derived from animals. On the other hand, where more neutral or other flavoring is to be achieved, vegetable oils may be employed.

In preparing the browning agent emulsions, the amounts of ingredients may be varied by including on a parts by weight basis about 10-90% fat, and about 10-30% water, and about 5-10% base. These ingredients vary over wide ranges depending upon the food being browned. The above ingredients are emulsified stabilized with a surfactant on the order of about 1-50% by weight. Preferably, stabilized browning emulsions may be formulated containing about 67.5% fat, 21% water, 9% base, and 2.5% surfactant. It will become apparent to a person of ordinary skill in the art that variations of ingredients in the emulsions may be achieved. Specific operating examples of this invention that illustrate its practice are as follows.

EXAMPLES

A browning agent emulsion of this invention was prepared by mixing the ingredients listed below.

TABLE I

| Ingredients | Example (% By Weight) | | |
|---|---|---|---|
| | A | B | C |
| Fat | 67.5 | 64 | 65.5 |
| Water | 21 | 21 | 21 |
| Base | 9 | 9 | 9 |
| Water Soluble Surfactant Santone 8-1-0 | .5 | — | — |
| Fat Soluble Surfactant | | | |
| Durem 204 | 2.0 | — | 2.0 |
| Lecithin | — | — | 2.5 |
| Sodium Caprylate | — | 6 | — |
| | 100.0 | 100 | 100.0 |

According to the above listing, the fat employed was a vegetable fat having a melting point of about 92° F. as supplied by Anderson Clayton. The base employed was a food grade potassium carbonate as made up in a solution with the water. The surfactants employed were Durem 204 supplied by Durkee and Santone 8-1-0 supplied by Durkee. Santone 8-1-0 is an octaglycerol monooleate. Durem-204 is about 50% glycerol monooleate in the $\alpha$ position with the remainder being monooleate in the $\beta$ position as well as some mono, di and triglycerides containing palmitic, stearic and oleic acids.

The browning agent emulsion was manufactured by heating the fat and fat soluble surfactant to about 102° F. in order to provide a melt. In Example A, the potassium carbonate was added to water followed by the addition of Santone 8-1-0 with blending until the Santone 8-1-0 was dissolved. Then, the fat mixture with Durem 204 was slowly added to the water/carbonate/Santone 8-1-0 ester solution while agitating until all of the fat mixture had been added. In Examples B and C, each fat mixture was slowly added to the water and base. Mixing of each Example continued with removal of the source of heat until room temperature was reached. The finished products had the consistency of soft margarine and appeared white in color. The browning agent emulsions can be stored at room temperature for up to several months.

In order to determine the affect of browning agents made in accordance with Examples A–C and the principles of this invention, pizza dough and potpie crusts were prepared for coating with the browning agent. The pizza dough compositions were prepared by combining the following ingredients.

TABLE II

| Component | Weight (g) | |
|---|---|---|
| | (1) | (2) |
| Wheat Flour | 618.2 | 618.2 |
| Water | 346.1 | 346.1 |
| Vegetable Oil | 9.3 | 9.3 |
| Sugar (Sucrose) | 13.7 | — |
| Yeast | 5.9 | 5.9 |
| Salt | 6.8 | 6.8 |
| Dextrose | — | 13.7 |
| | 1000.0 | 1000.0 |

The dry components of the Table II were combined and mixed in a commercial mixer unit to form a uniform blend. To this blend was added the oil with mixing, then the water at low mixing speed until the flour became wet. The total mixture was then kneaded at medium to high speed for about 5 or 6 minutes and fermented 1 to 1.5 hours. The dough was let to stand for about 3 minutes, followed by formation of the shaped pizza base.

The browning agents made according to the above TABLE I were then brushed onto the pizza shaped dough and then introduced into frozen storage that may extend up to about six months. The frozen pizzas were then cooked in a microwave oven. The pizza crust containing the browning agent had a very attractive appearance upon removal from storage and, upon microwave cooking, developed an excellent browning appearance upon microwave heating.

Fruit and potpies containing a covering of a flour base foodstuff were prepared from a pie covering formulation listed below.

TABLE III

| | |
|---|---|
| Flour | 52.0 |
| Salt | 1.5 |
| Dextrose | 2.5 |
| Hydrogenated Shortening | 26.0 |
| Water | 18.0 |
| | 100% |

The ingredients for this formulation were combined in the following manner. The dry components were weighed and mixed until uniform. The shortening was then folded into the dry mix and stirred until uniform. Then, water was added and thoroughly mixed with the dry mix containing shortening. The resulting dough mass for each formulation was then formed into a circular top crust, added to a conventional 8 oz. potpie and then stored in a freezer for at least about 48 hours. The frozen potpies were later removed from storage and cooked in a 600 watt microwave oven for about 9 mins. Optionally the formulations may contain flavoring. Prior to the introduction into frozen storage and microwaving, the potpies were coated by brushing on the browning agent of TABLE I produced above. The cooked crust sheets were then evaluated for their appearance after removal from storage and upon microwave cooking. Upon removal from storage, the crust looked very attractive and, after microwave cooking, the crusts provided an excellent browned appearance. The browning agent thus produces excellent results on high fat dough products of the pot pie, tater tot and the like variety.

Having described the invention and its various parameters, other modifications will become apparent to a person of ordinary skill in the art without departing from the scope of this invention.

What is claimed is:

1. A browning agent for coating onto or incorporation into a foodstuff having a carbonyl-containing browning reactant comprising
a water-in-oil emulsion containing water in the discontinuous phase and oil in the continuous phase, a surfactant for stabilization of said emulsion and an edible base for providing a pH on the order of about 8 to 13 in the aqueous phase of said emulsion protected against transfer from said aqueous phase for reaction with said carbonyl-containing browning reactant until heating, said emulsion adapted under the action of heat during a normal cooking cycle to break down causing said base to come into contact with said carbonyl-containing browning reactant thereby to induce the browning reaction in said foodstuff upon cooking.

2. The browning agent of claim 1 wherein said foodstuff further contains an amino acid.

3. The browning agent of claim 1 wherein said base is selected from the group of alkali metal carbonates or phosphates.

4. The browning agent of claim 1 wherein said emulsion is substantially transparent.

5. The browning agent of claim 1 wherein said foodstuff is a flour based foodstuff.

6. The browning agent of claim 1 coated onto or incorporated into a flour-based foodstuff.

7. The browning agent of claim 6 wherein said foodstuff is storable at temperatures of about $-30°$ C. to about $10°$ C. and thereafter immediately microwavable until cooked.

8. The browning agent of claim 1 coated onto or incorporated into biscuits, pizza, pie coverings, or hash brown potatoes.

9. The browning agent of claim 1 containing oil from about 10–90% by weight, water from about 1 to about 30% by weight, base from about 5 to about 10% by weight, and surfactant from about 1 to about 50% by weight.

10. The browning agent of claim 9 wherein said foodstuff is microwavable.

* * * * *